L. WAGNER.
AGRICULTURAL MACHINE.
APPLICATION FILED NOV. 13, 1917.
1,314,838.
Patented Sept. 2, 1919.
2 SHEETS—SHEET 1.
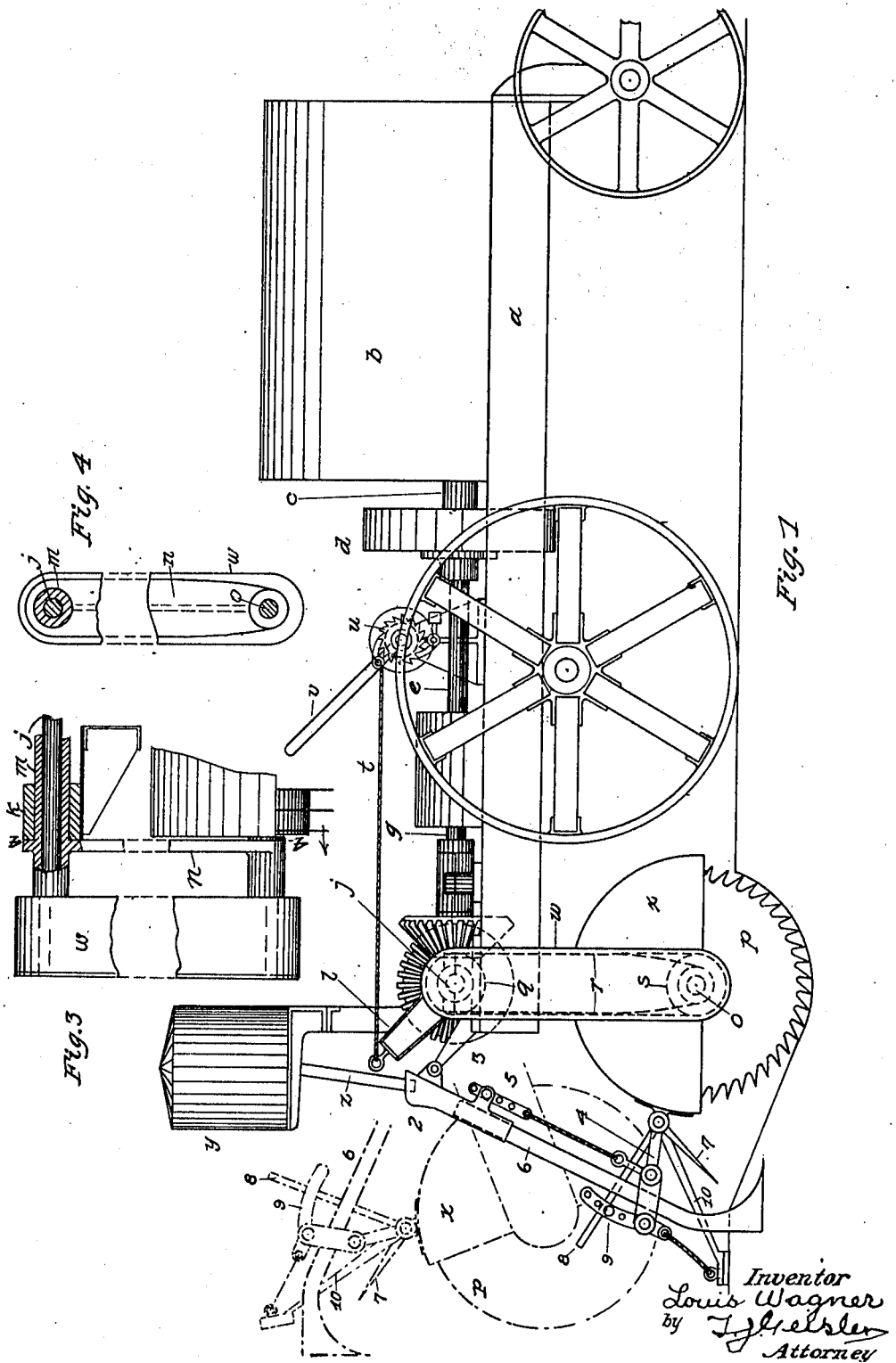

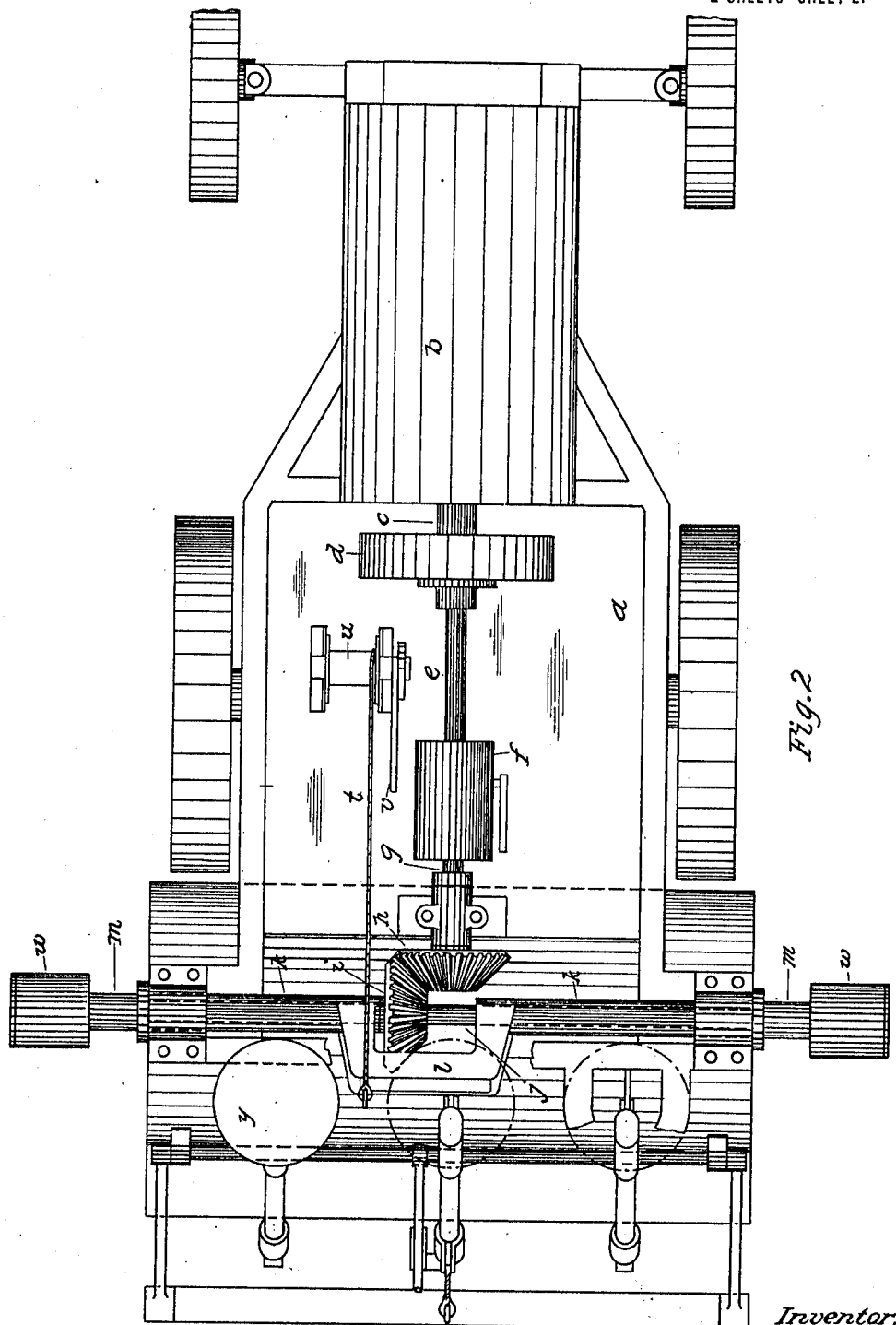

UNITED STATES PATENT OFFICE.

LOUIS WAGNER, OF NEWBERG, OREGON, ASSIGNOR OF ONE-HALF TO EDWARD CREDE, OF NEWBERG, OREGON.

AGRICULTURAL MACHINE.

1,314,838. Specification of Letters Patent. Patented Sept. 2, 1919.

Application filed November 13, 1917. Serial No. 205,463.

*To all whom it may concern:*

Be it known that I, LOUIS WAGNER, a citizen of the United States, and a resident of Newberg, Yamhill county, State of Oregon, have invented a certain new and useful Improvement in Agricultural Machines, of which the following is a specification.

The object of my invention is to obtain a simple but efficient agricultural machine combining earth-working devices,—these being power-driven—seed planting devices, a baffle-board, and an earth leveler for covering again the seed furrows, all carried in such way that they may be readily raised and lowered as a unit, and at the same time providing for the relative independent adjustment of the seed planting device and the baffle-board with respect to the earth pulverizing devices and to each other.

These features of my machine are illustrated in the accompanying drawings, in which:

Figure 1 represents a side elevation of those parts of my machine with which my invention is concerned;

Fig. 2 is a top view of the same parts;

Fig. 3 is an end view of one side of my machine, illustrating parts of the means for suspending and driving the earth-working tool; and Fig. 4 is a view taken on the line 4—4 of Fig. 3, looking in the direction pointed by the arrow.

The vehicle body, $a$, is wheel-mounted, as shown. $b$ represents the housing which is assumed to contain a driving engine, of which $c$ represents the shaft, $d$ the fly wheel, and $e$ a longitudinal shaft. $f$ is a clutch element operated by a lever and serving to connect the shaft $e$ with a companion shaft $g$, on which is mounted a bevel gear $h$, meshing with the companion bevel gear $i$, fast on a shaft $j$, which revolves in a divided sleeve box $k$, the two ends of which are connected by a yoke $l$. The ends of the sleeve box $k$ are journaled in boxes $m$, and these ends support hangers or legs $n$, in the lower ends of which is journaled a shaft $o$, carrying saw-like earth-pulverizing devices as $p$. The ends of the driven shaft $j$ extend beyond the upper box of the leg $n$ and carry sprocket wheels $q$, connected by sprocket chains $r$ with sprocket wheels $s$ on the extremities of the shaft $o$; these devices being represented diagrammatically only, since their construction is readily understood by any mechanic, and they constitute the driving connections between the shaft $j$ and shaft $o$ and the earth-working devices $p$. The yoke $l$ is connected by a cable $t$ with a drum $u$, which is rotated by a lever and ratchet element $v$, and these means provide for the raising and lowering of the pendent legs supporting the earth pulverizing means, so that the depth of the cut of these into the ground may be adjusted as desired.

The devices for transmitting the power from the driven shaft $j$ to the shaft $s$ of the earth-pulverizing tool are incased by a casing $w$, and between the legs $n$ supporting the shaft of the earth-working tool is a hood $x$, inclosing the upper portion of the earth-working tool. $y$ is a seed container supported on the vehicle body and having a downwardly discharging spout $z$. 2 is a conveyer tube pivoted to an arm 3 supported by the vehicle body. On the hood is pivoted an arm 4 which is supported by some suitable means, such as 5, adapted for raising and lowering this arm as desired. The arm 4 rigidly holds a seeder 6, into the upper end of which the seed is discharged from the conveyer tube 2. On the same axis as that of the hinge arm 4 is hinged a baffle board 7 provided with a rigid arm 8 and means, as 9, for supporting the same, and therewith the baffle board 7, as desired. 10 is an earth-leveler or drag, the function of which is to cover over the seed furrows made by the lower end of the seeder 6 in the ground.

Details of the vehicle not connected with my invention are not shown, since all other parts of my agricultural machine than those above specifically described may be built as convenient.

I claim:

1. In an agricultural machine comprising a vehicle body and an engine mounted thereon, the combination of a transverse driven shaft, a pendent leg pivoted at each side of the vehicle body on an axis coincident with the axis of rotation of said transverse driven shaft, a rotary earth-pulverizing tool journaled in the free ends of the legs, driving connections from the driven shaft to such earth-pulverizing tool, a hood covering the upper part of the earth pulverizing tool, means for raising and lowering the legs with respect to the ground and thereby regulating the depth of cut of the earth-working tool, a seed container supported on the vehicle body and having a downwardly discharging spout, a conveyer tube pivotally supported on the vehicle body into which said spout of the seed container discharges, a rearwardly extending support pivoted to said hood of the earth-working-tool, a seeder carried by said support and having a connection with said conveyer tube adapted to accommodate the movements of the seeder in unison with said legs, and means for lifting and lowering said support.

2. In an agricultural machine comprising a vehicle body and an engine mounted thereon, the combination of a transverse driven shaft, a pendent leg pivoted at each side of the vehicle body on an axis coincident with the axis of rotation of said transverse driven shaft, a rotary earth-pulverizing tool journaled in the free ends of the legs, driving connections from the driven shaft to such earth-pulverizing tool, a hood covering the upper part of the earth pulverizing tool, means for raising and lowering the legs with respect to the ground and thereby regulating the depth of cut of the earth-working-tool, a seed container supported on the vehicle body and having a downwardly discharging spout, a conveyer tube pivotally supported on the vehicle body into which said spout of the seed container discharges, a rearwardly extending support pivoted to said hood of the earth-working-tool, a seeder carried by said support and having a connection with said conveyer tube adapted to accommodate the movements of the seeder in unison with said legs, and means for lifting and lowering said support, such means suspended from said conveyer tube.

LOUIS WAGNER.

Copies of this patent may be obtained for five cents each, by addressing the "Commissioner of Patents, Washington, D. C."